(12) United States Patent
Lambert et al.

(10) Patent No.: US 10,297,880 B2
(45) Date of Patent: May 21, 2019

(54) BATTERY THERMAL MANAGEMENT SYSTEM

(71) Applicant: FORD GLOBAL TECHNOLOGIES, LLC, Dearborn, MI (US)

(72) Inventors: Steven L. Lambert, Washington, MI (US); Manfred Koberstein, Troy, MI (US); Ali Jalilevand, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 331 days.

(21) Appl. No.: 15/133,382

(22) Filed: Apr. 20, 2016

(65) Prior Publication Data

US 2017/0309976 A1    Oct. 26, 2017

(51) Int. Cl.

| H01M 10/613 | (2014.01) |
|---|---|
| H01M 10/625 | (2014.01) |
| H01M 10/6568 | (2014.01) |
| F25B 5/04 | (2006.01) |
| F25D 17/02 | (2006.01) |
| B60H 1/00 | (2006.01) |
| F25B 5/00 | (2006.01) |
| H01M 10/48 | (2006.01) |
| H01M 10/633 | (2014.01) |
| H01M 10/663 | (2014.01) |

(52) U.S. Cl.
CPC ...... *H01M 10/613* (2015.04); *B60H 1/00278* (2013.01); *F25B 5/00* (2013.01); *F25B 5/04* (2013.01); *F25D 17/02* (2013.01); *H01M 10/486* (2013.01); *H01M 10/625* (2015.04); *H01M 10/633* (2015.04); *H01M 10/6568* (2015.04); *H01M 10/663* (2015.04); *B60H 2001/00307* (2013.01); *H01M 2220/20* (2013.01)

(58) Field of Classification Search
None
See application file for complete search history.

(56) References Cited

U.S. PATENT DOCUMENTS

| 8,781,658 | B2 | 7/2014 | Simonini | |
|---|---|---|---|---|
| 2002/0184908 | A1* | 12/2002 | Brotz | B60H 1/00 62/259.2 |
| 2003/0233840 | A1* | 12/2003 | Choi | B60H 1/3222 62/236 |
| 2005/0028542 | A1 | 2/2005 | Yoshida et al. | |
| 2012/0109433 | A1* | 5/2012 | Simonini | B60L 1/003 701/22 |

(Continued)

FOREIGN PATENT DOCUMENTS

| JP | 5515858 B2 | 6/2014 |
|---|---|---|
| WO | 2012/077062 A1 | 6/2012 |
| WO | 2014/188674 A1 | 11/2014 |

*Primary Examiner* — Wyatt P McConnell
(74) *Attorney, Agent, or Firm* — Carlson, Gaskey & Olds (57) ABSTRACT

A battery thermal management system according to an exemplary aspect of the present disclosure includes, among other things, a battery pack, a coolant subsystem including a chiller configured to cool the battery pack, and a refrigerant subsystem including at least one evaporator. The coolant subsystem is arranged to exchange heat with the refrigerant subsystem within the chiller. A tap line extends from the at least one evaporator to the chiller.

21 Claims, 6 Drawing Sheets

(56) References Cited

U.S. PATENT DOCUMENTS

2012/0297809 A1     11/2012   Carpenter
2013/0074525 A1*    3/2013   Johnston ............ B60H 1/00278
                                                                              62/56
2015/0013367 A1      1/2015   Carpenter
2015/0191072 A1      7/2015   Inoue et al.

* cited by examiner

BATTERY THERMAL MANAGEMENT SYSTEM

TECHNICAL FIELD

This disclosure relates to a battery thermal management system for an electrified vehicle. The battery thermal management system includes a coolant subsystem having a chiller that rejects heat of a coolant to a refrigerant tapped from an evaporator of a refrigerant subsystem. The chilled coolant exiting the chiller is used to thermally manage a battery pack of the electrified vehicle.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged to replenish the energy necessary to power these loads. The battery cells generate heat, such as during charging and discharging operations. Battery thermal management systems are sometimes employed to manage the heat generated by the battery cells.

SUMMARY

A battery thermal management system according to an exemplary aspect of the present disclosure includes, among other things, a battery pack, a coolant subsystem including a chiller configured to cool the battery pack, and a refrigerant subsystem including at least one evaporator. The coolant subsystem is arranged to exchange heat with the refrigerant subsystem within the chiller. A tap line extends from the at least one evaporator to the chiller.

In a further non-limiting embodiment of the foregoing system, the tap line is configured to communicate a refrigerant from the at least one evaporator to a cold side of the chiller.

In a further non-limiting embodiment of either of the foregoing systems, the tap line extends from a manifold of the at least one evaporator.

In a further non-limiting embodiment of any of the foregoing systems, the coolant subsystem includes a pump configured to circulate a coolant through the chiller.

In a further non-limiting embodiment of any of the foregoing systems, the coolant releases heat to a refrigerant of the refrigerant subsystem within the chiller.

In a further non-limiting embodiment of any of the foregoing systems, the refrigerant subsystem includes a compressor.

In a further non-limiting embodiment of any of the foregoing systems, the refrigerant subsystem includes a condenser.

In a further non-limiting embodiment of any of the foregoing systems, the refrigerant subsystem includes a heat exchanger.

In a further non-limiting embodiment of any of the foregoing systems, the at least one evaporator includes a front evaporator and a rear evaporator, and a first expansion device is configured to control flow of a refrigerant to the front evaporator and a second expansion device is configured to control flow of the refrigerant to the rear evaporator and the chiller.

In a further non-limiting embodiment of any of the foregoing systems, a control unit is configured to selectively actuate the first expansion device and the second expansion device.

In a further non-limiting embodiment of any of the foregoing systems, the first expansion device and the second expansion device include a thermal expansion valve.

In a further non-limiting embodiment of any of the foregoing systems, the at least one evaporator includes a manifold and a baffle positioned within the manifold.

In a further non-limiting embodiment of any of the foregoing systems, the baffle divides the manifold into a first section and a second section that is fluidly isolated from the first section.

In a further non-limiting embodiment of any of the foregoing systems, a shut-off valve is disposed in the tap line and configured to prevent communication of a refrigerant to the chiller.

A method according to another exemplary aspect of the present disclosure includes, among other things, controlling a flow of refrigerant to a front evaporator of a refrigerant subsystem with a first expansion device, and controlling the flow of the refrigerant to a rear evaporator of the refrigerant subsystem and to a chiller of a coolant subsystem with a second expansion device.

In a further non-limiting embodiment of the foregoing method, the method includes communicating the refrigerant from the rear evaporator to a cold side of the chiller within a tap line.

In a further non-limiting embodiment of either of the foregoing methods, the method includes releasing heat from a coolant of the coolant subsystem to the refrigerant of the refrigerant subsystem within the chiller.

In a further non-limiting embodiment of any of the foregoing methods, the method includes communicating the coolant exiting the chiller to a battery pack for thermally managing battery cells of the battery pack.

In a further non-limiting embodiment of any of the foregoing methods, the method includes splitting the flow of the refrigerant inside the rear evaporator such that a portion of the refrigerant is directed to the chiller.

In a further non-limiting embodiment of any of the foregoing methods, the method includes monitoring a temperature of a battery pack, comparing the temperature to a temperature threshold, and controlling the flow of the refrigerant from the rear evaporator to the chiller if the temperature exceeds the temperature threshold.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a battery thermal management system for an electrified vehicle. The battery thermal management system includes a coolant subsystem for thermally managing a battery pack and a refrigerant subsystem for thermally managing a passenger cabin of the electrified vehicle. The coolant subsystem includes a chiller that rejects or releases heat to refrigerant that is tapped from an evaporator of the refrigerant subsystem. Chilled coolant that exits the chiller may be directed through the battery pack to remove heat from the battery pack. These and other features are discussed in greater detail in the following paragraphs of this detailed description.

Figure 1:
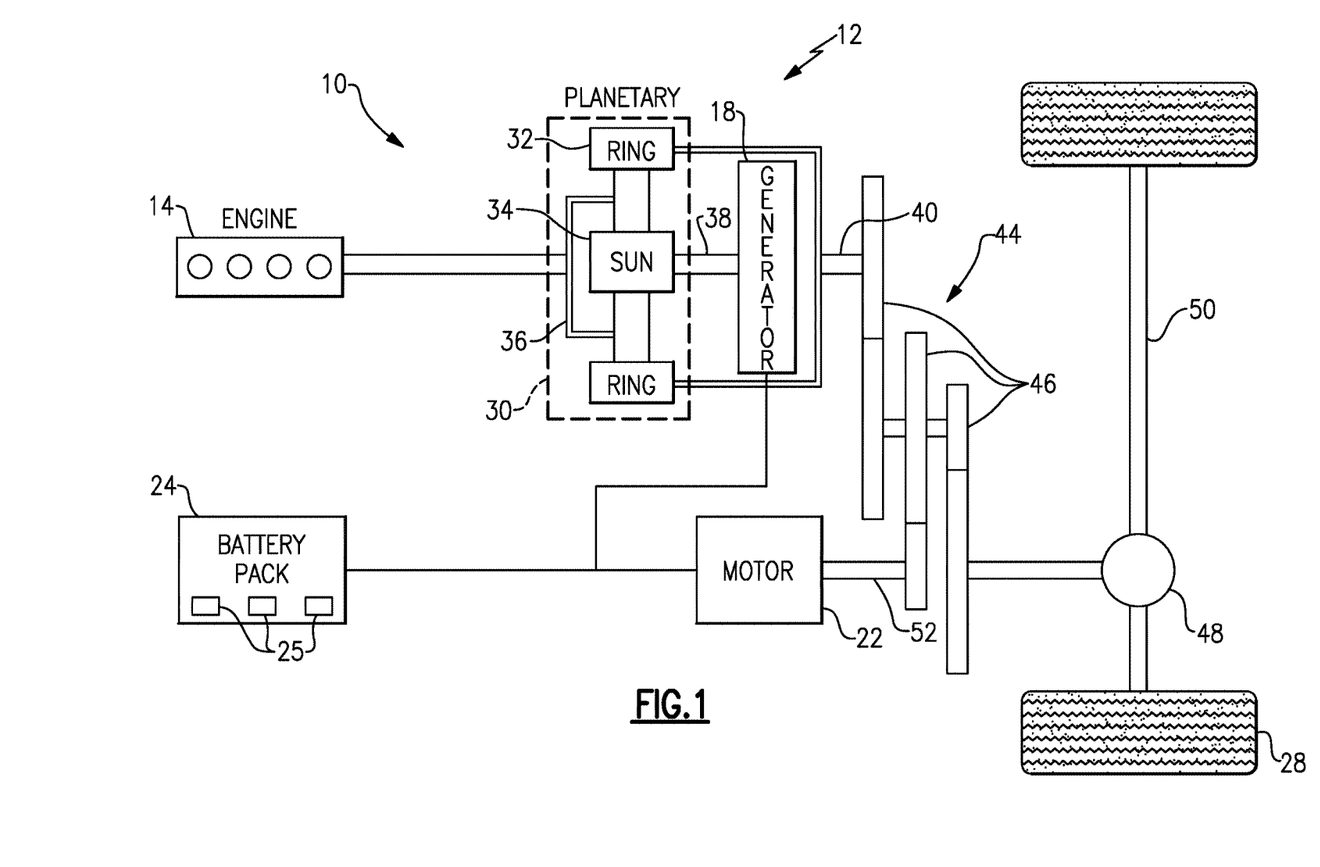
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
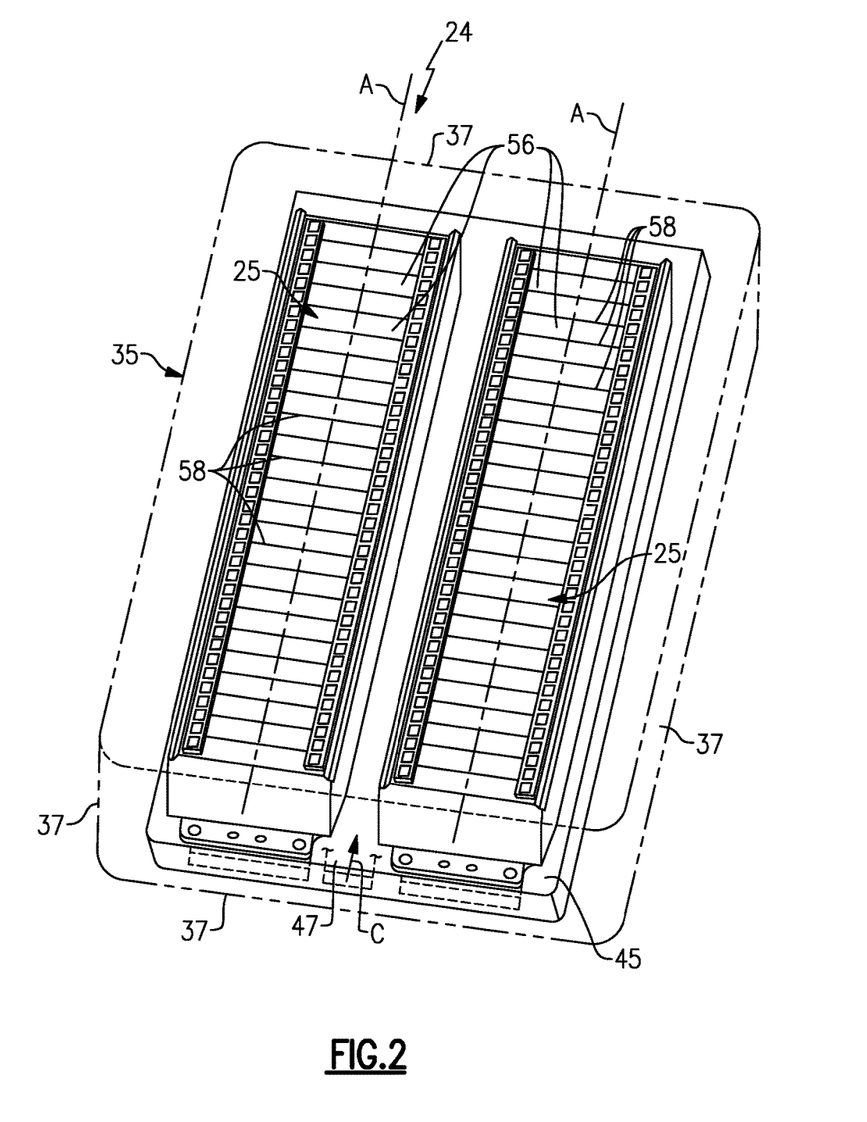
FIG. 2 illustrates a battery pack of an electrified vehicle.

Referring now to FIG. 2, the battery pack 24 includes a plurality of battery cells 56 for supplying electrical power to various electrical loads of the electrified vehicle 12. Although a specific number of battery cells 56 are depicted in FIG. 2, the battery pack 24 could employ a fewer or greater number of battery cells within the scope of this disclosure. In other words, this disclosure is not limited to the specific configuration shown in FIG. 2. The battery cells 56 may be stacked side-by-side along a longitudinal axis A to construct a grouping of battery cells 56, sometimes referred to as a "cell stack." In one non-limiting embodiment, the battery pack 24 includes two separate groupings of battery cells 56 (i.e., two cell stacks).

In another non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

In yet another non-limiting embodiment, spacers 58, which are sometimes referred to as separators or dividers, are optionally positioned between adjacent battery cells 56 of each grouping of battery cells 56. The spacers 58 can include thermally resistant and electrically isolating plastics and/or foams. The battery cells 56 and the spacers 58, along with any other support structures (e.g., rails, walls, plates, etc.), may collectively be referred to as a battery assembly 25, or battery array. Two battery assemblies 25 are shown in FIG. 2; however, the battery pack 24 could include only a single battery assembly or greater than two battery assemblies.

An enclosure 35 generally surrounds the battery assemblies 25 of the battery pack 24. The enclosure 35 includes a plurality of walls 37 arranged to substantially enclose the battery assemblies 25. The walls 37 may be part of a tray and a cover of the enclosure 35, in another non-limiting embodiment.

Each battery assembly 25 can optionally be positioned relative to a heat exchanger plate 45, sometimes referred to as a cold plate. Other heat exchangers may alternatively be used. The heat exchanger plate 45 is configured to conduct heat out of the battery cells 56. In other words, the heat exchanger plate 45 acts as a heat sync to remove heat from the heat sources (i.e., the battery cells 56). In one non-limiting embodiment, the heat exchanger plate 45 includes an internal cooling circuit 47 for circulating a fluid, such as coolant C, to thermally condition the battery cells 56 of the battery pack 24. This disclosure is not limited to the specific cooling circuit configuration shown in FIG. 2. That is, the internal cooling circuit 47 may embody any size, shape or configuration for circulating fluid through the heat exchanger plate 45 to remove thermal energy from the battery cells 56.

During certain conditions, a significant amount of heat can be generated by the battery cells 56. It is desirable to manage this heat to improve capacity and life of the battery cells 56 and thereby improve the efficiency of the battery pack 24. Systems and techniques for actively managing this heat are therefore detailed below.

Figure 3:
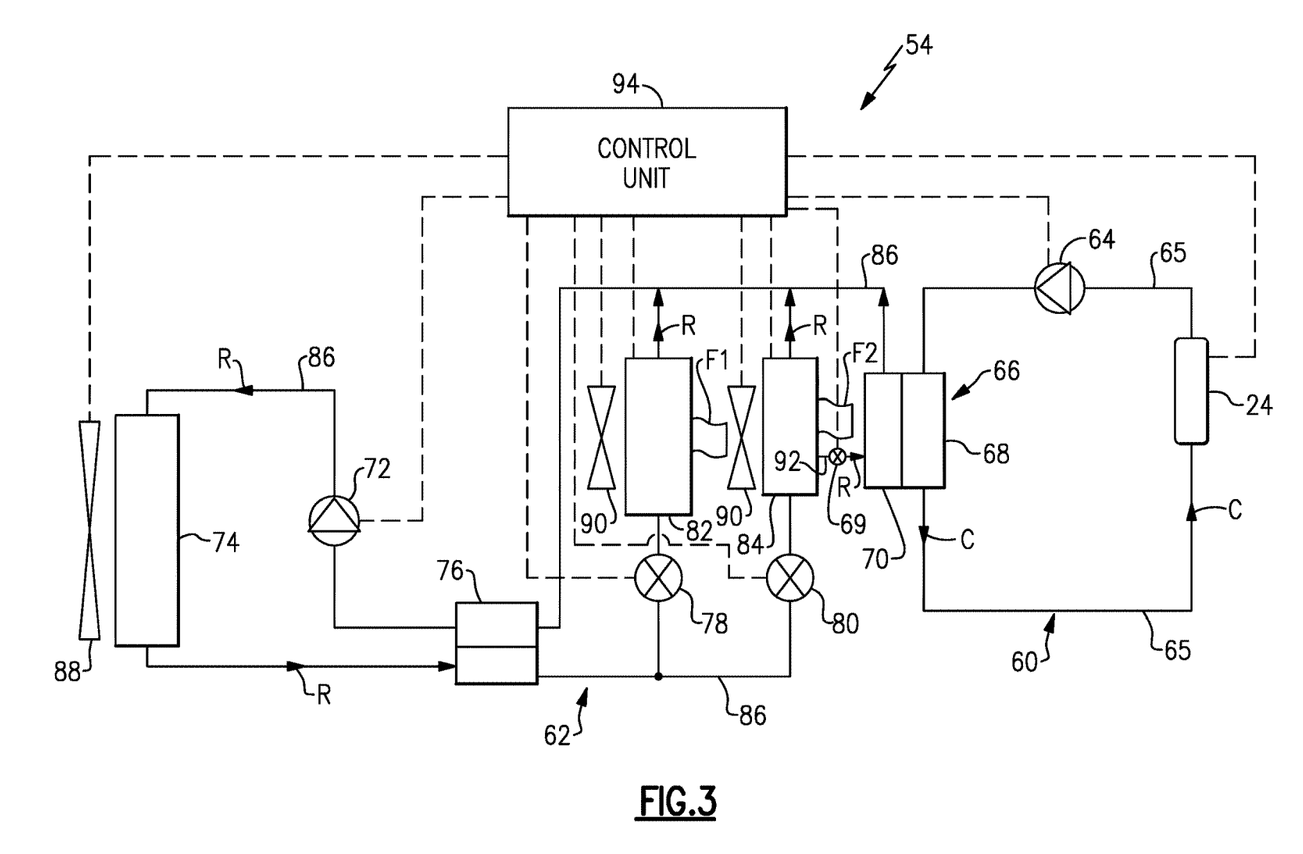
FIG. 3 schematically illustrates a battery thermal management system of an electrified vehicle.

FIG. 3, with continued reference to FIGS. 1 and 2, schematically illustrates a battery thermal management system 54 for managing the thermal load of the battery pack 24. In one non-limiting embodiment, the battery thermal management system 54 selectively communicates a coolant C through the battery pack 24 to cool the battery pack 24 by removing the heat generated by the battery cells housed therein. The coolant C can be circulated through the internal cooling circuit 47 of the heat exchanger plate 45 (see FIG. 2) or in some other manner to remove heat from the battery cells.

The battery thermal management system 54 of this non-limiting embodiment includes a coolant subsystem 60 and a refrigerant subsystem 62. These systems are described in greater detail below.

The coolant subsystem 60, or coolant loop, circulates the coolant C, such as water mixed with ethylene glycol or any other suitable coolant, to thermally manage the battery pack 24. In one non-limiting embodiment, the coolant subsystem 60 includes a pump 64 and a chiller 66. The coolant C is directed through coolant lines 65 of the coolant subsystem 60.

The pump 64 circulates the coolant C through the coolant subsystem 60. During operation of the coolant subsystem 60, warm coolant C that exits the battery pack 24 is delivered to a hot side 68 of the chiller 66. The coolant C that enters the hot side 68 of the chiller 66 exchanges heat with refrigerant R that is tapped from the refrigerant subsystem 62 and directed through a cold side 70 of the chiller 66. In other words, the chiller 66 facilitates the transfer of thermal energy between the coolant subsystem 60 and the refrigerant subsystem 62 by allowing the coolant C to reject heat to the refrigerant R inside the chiller 66. Chilled coolant C that exits from the chiller 66 is communicated back to the battery pack 24 where the thermal management cycle can repeat itself in the closed loop coolant subsystem 60.

The refrigerant subsystem 62, or refrigerant loop, circulates refrigerant R to transfer thermal energy to or from a passenger cabin (not shown) of the vehicle and/or to or from the coolant subsystem 60. The refrigerant subsystem 62 may be part of a vehicle cabin air conditioning system that is configured to deliver conditioned airflow to the passenger cabin. The refrigerant subsystem 62 is configured to deliver conditioned airflow to both front row seating and rear row seating, including third row seating if the vehicle is so equipped, of the passenger cabin.

In one non-limiting embodiment, the refrigerant subsystem 62 includes a compressor 72, a condenser 74, a heat exchanger 76, a first expansion device 78, a second expansion device 80, a front evaporator 82 and a rear evaporator 84. Refrigerant R is communicated in a closed loop within refrigerant lines 86 of the refrigerant subsystem 62.

The compressor 72 pressurizes and circulates the refrigerant R through the refrigerant subsystem 62. Low pressure, low temperature refrigerant R that is in vapor state is communicated from the front evaporator 82, the rear evaporator 84 and the heat exchanger 76 to the compressor 72. The compressor 72 compresses the refrigerant R into a high pressure, high temperature vapor which is then sent to the condenser 74. The high pressure, high temperature vapor refrigerant R is next passed through the condenser 74, which includes a coil (not shown). A fan 88 directs ambient air across the coil to transfer heat from the high pressure, high temperature vapor refrigerant R to the ambient air blowing across the coil.

The refrigerant R exiting the condenser 74 is a high pressure, high temperature liquid that may then enter a receiver-dryer that serves as a filter to remove any moisture and contaminants within the refrigerant subsystem 62. For example, the receiver-dryer may include a desiccant for removing moisture from the refrigerant R. In a first non-limiting embodiment, the condenser 74 and the receiver-dryer are combined into a single unit. However, these components could alternatively be separate from one another.

After exiting the condenser 74, the high pressure, high temperature liquid refrigerant R is communicated to the heat exchanger 76 where it can exchange heat with refrigerant R that has exited the front evaporator 82 and/or the rear evaporator 84.

The refrigerant R exiting the heat exchanger 76 is communicated to the first expansion device 78 and the second expansion device 80. The expansion devices 78, 80 are adapted to change the pressure of the refrigerant R. For example, the first expansion device 78 and the second expansion device 80 may be an electronic expansion valve, a thermal expansion valve (TXV) or a fixed area valve, such as a fixed orifice tube, that may be externally controlled. In one non-limiting embodiment, the expansion devices 78, 80 are adapted to reduce the pressure of the refrigerant R that passes therethrough. Therefore, high pressure refrigerant R received from the heat exchanger 76 may exit the first and second expansion devices 78, 80 at a lower pressure and as a liquid and vapor mixture, for example.

The first expansion device 78 controls the amount of refrigerant R entering the front evaporator 82. For example, in one non-limiting embodiment, if the temperature of the refrigerant R exiting the front evaporator 82 is too hot, the first expansion device 78 opens to allow more liquid refrigerant to flow into the front evaporator 82. Alternatively, if the temperature of the refrigerant R exiting the front evaporator is too cold, the first expansion device 78 closes, thereby reducing the amount of refrigerant R flowing into the front evaporator 82.

The second expansion device 80 controls the amount of refrigerant R entering the rear evaporator 84. In one non-limiting embodiment, if the temperature of the refrigerant exiting the rear evaporator 84 is too hot, the second expansion device 80 opens to allow more liquid refrigerant R to flow into the rear evaporator 84. Alternatively, if the temperature of the refrigerant R exiting the rear evaporator 84 is too cold, the second expansion device 80 closes, thereby reducing the amount of refrigerant flowing into the rear evaporator 84.

The refrigerant R exiting the first and second expansion devices 78, 80 is a low pressure, low temperature liquid and vapor mixture that then enters the front evaporator 82, the rear evaporator 84 and/or the chiller 66 of the coolant subsystem 60. A fan 90 can be associated with each of the front and rear evaporators 82, 84. The fans 90 blow air across the front and rear evaporators 82, 84 to reject heat to the refrigerant R. Conditioned airflows F1 and F2 are then introduced into the passenger cabin to address the climate needs of the vehicle occupants.

In a non-limiting embodiment, the front evaporator 82 and the rear evaporator 84 are positioned at different locations inside the passenger cabin of the vehicle to provide zoned cooling. For example, the front evaporator 82 can be positioned to direct the conditioned airflow F1 to a first zone that includes front row seating of the vehicle, whereas the rear evaporator 84 can be positioned to direct the conditioned airflow F2 to a second zone that includes rear row seating and/or third row seating of the vehicle.

The refrigerant R exiting the front and rear evaporators 82, 84 is a low pressure, low temperature superheated vapor that flows through the heat exchanger 76 and back again to the compressor 72. The air conditioning cycle may then repeat itself.

A portion of the refrigerant R that enters the rear evaporator 84 from the second expansion device 80 may be directed to the cold side 70 of the chiller 66 within a tap line 92. The tap line 92 extends from the rear evaporator 84 to the chiller 66. The actual location of the tap line 92 relative to the rear evaporator 84 may be based on battery heat rejection requirements. In other words, this disclosure is not limited to the specific location of the tap line 92 shown in FIGS. 3 and 5 and could be moved to achieve varying levels of heat transfer.

As referenced above, the refrigerant R entering the cold side 70 of the chiller 66 through the tap line 92 accepts heat from the coolant C passed through the hot side 68 of the chiller 66 to chill the coolant C. The chilled coolant C may subsequently be used to thermally manage the battery pack 24.

By supplying the chiller 66 with refrigerant R that is tapped from the rear evaporator 84, a separate expansion device is not required to control the flow of refrigerant R to the chiller 66. Thus, only two expansion devices 78, 80 are necessary to control the flow of the refrigerant R to each of the front evaporator 82, the rear evaporator 84 and the chiller 66.

In another non-limiting embodiment, a shut-off valve 69 may optionally be positioned within the tap line 92. The shut-off valve 69 may be actuated to prevent refrigerant R from entering the chiller 66. This may be done, for example, during conditions where the battery pack 24 does not require cooling.

Figure 4:
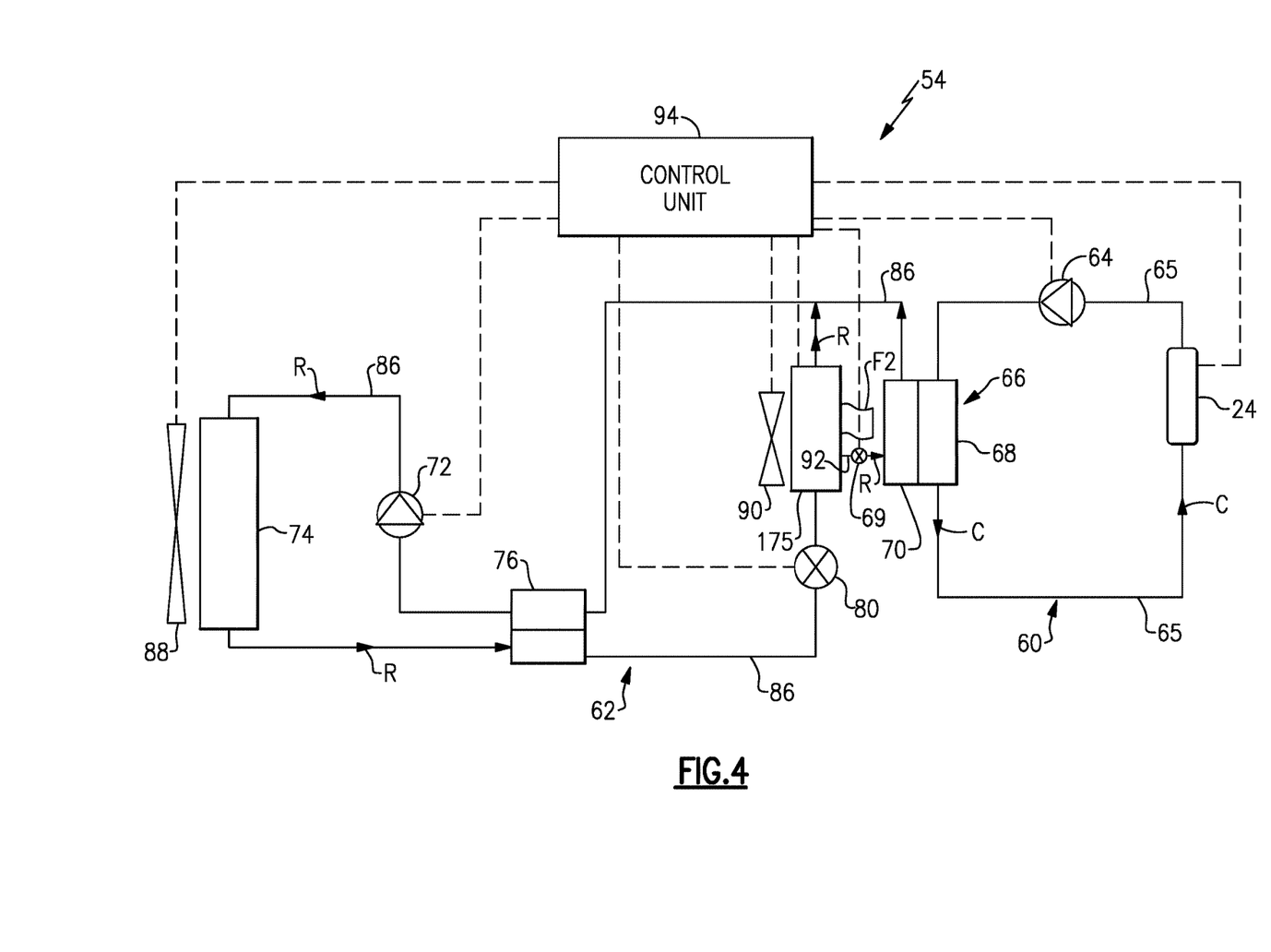
FIG. 4 schematically illustrates another exemplary battery thermal management system.

Although shown including first and second evaporators (i.e., front and rear evaporators 82, 84) in FIG. 3, the refrigerant subsystem 62 could include only a single evaporator 175 for delivering conditioned airflow to the passenger cabin and for selectively delivering refrigerant R to the chiller 66 (see, for example, the battery thermal management system 54 of FIG. 4). In such an embodiment, the single evaporator 75 acts similar to a front evaporator.

A control unit 94 is configured to control operation of the battery thermal management system 54. The control unit 94 could be part of an overall vehicle control unit, such as a vehicle system controller (VSC), or could alternatively be a stand-alone control unit separate from the VSC, such as a battery control module. In one non-limiting embodiment, the control unit 94 is programmed with executable instructions for interfacing with and operating the various components of the battery thermal management system 54. The control unit 94 includes various inputs and outputs for interfacing with the various components of the battery thermal management system 54, including but not limited to the battery pack 24, the pump 64, the compressor 72, the first expansion device 78, the second expansion device 80, the fans 88, 90 and the shut-off valve 99. The control unit 94 additionally includes a processing unit and non-transitory memory for executing the various control strategies and modes of the battery thermal management system 54.

In another non-limiting embodiment, the control unit 94 is adapted to monitor a temperature of the battery pack 24. The control unit 94 may receive feedback from various sensors (not shown) that monitor the temperature of the battery pack 24, including but not limited to ambient sensors and battery cell sensors. Based on feedback from such sensors, the control unit 94 can control the coolant subsystem 60 and the refrigerant subsystem 62 to deliver a desired level of cooling to the battery pack 24. Among various other control functions, the control unit 94 can open and/or close the expansion devices 78, 80 to deliver a desired amount of refrigerant R to the chiller 66 through the tap line 92 in a manner that influences the thermal management of the battery pack 24.

Figure 5:
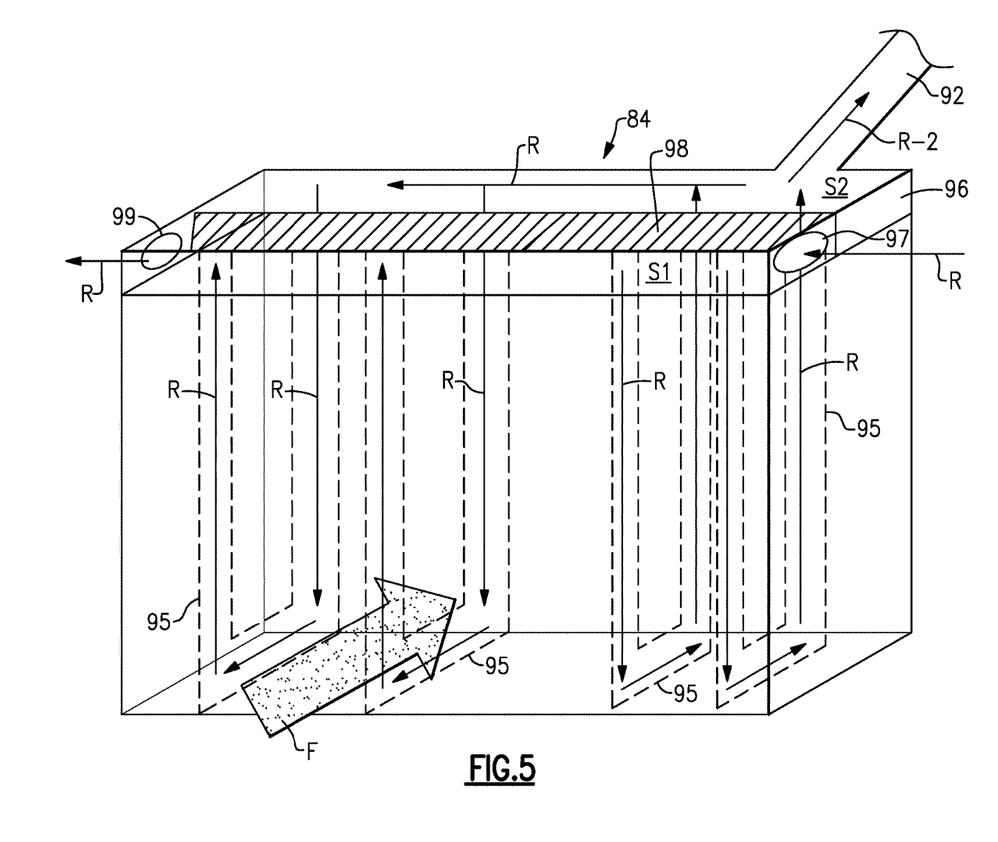
FIG. 5 illustrates an evaporator of a battery thermal management system.

FIG. 5 illustrates additional features of the rear evaporator 84 (or the single evaporator 175 of FIG. 4). In a non-limiting embodiment, the rear evaporator 84 is a multi-pass tube and fin evaporator. Although a specific number of passes are shown in FIG. 5, this disclosure encompasses evaporators having any number of passes, and thus, any number of tubes and fins.

The rear evaporator 84 includes a manifold 96, a baffle 98, a plurality of tubes 95, an inlet 97 and an outlet 99. The tubes 95 are shown in dashed lines to better illustrate the flow path of the refrigerant R inside the rear evaporator 84. Although not shown, fins or other heat transfer devices may be positioned between adjacent tubes 95 for increasing the rate of heat transfer between the refrigerant R circulated within the tubes 95 and an airflow F that is passed across the fins and the tubes 95.

During operation of the refrigerant subsystem 62, the refrigerant R enters the manifold 96 of the rear evaporator 84 through the inlet 97. The refrigerant R entering the inlet 97 is a liquid and vapor mixture. The baffle 98 is arranged inside the rear evaporator 84 and divides the manifold 96 into a first section S1 and a second section S2 that are fluidly isolated from one another. The refrigerant R enters the first section S1 of the manifold 96 after passing through the inlet 97. From there, as shown by the arrows, the refrigerant R is forced into the tubes 95 and is circulated along a first pass (down in FIG. 5) and a second pass (up in FIG. 5). After the second pass, the refrigerant R may enter the second section S2 of the manifold 96.

The refrigerant R can matriculate further downstream (to the left in FIG. 5) after entering the second section S2 of the manifold 96. In addition, a portion R-2 of the refrigerant R can enter the tap line 92 for communication to the chiller after the refrigerant R enters the second section S2 of the manifold 96.

The refrigerant R that flows downstream eventually enters additional tubes 95 and undergoes additional passes prior to exiting the rear evaporator 84 through the outlet 99. The refrigerant R that exits the outlet 99 is a superheated vapor.

Figure 6:
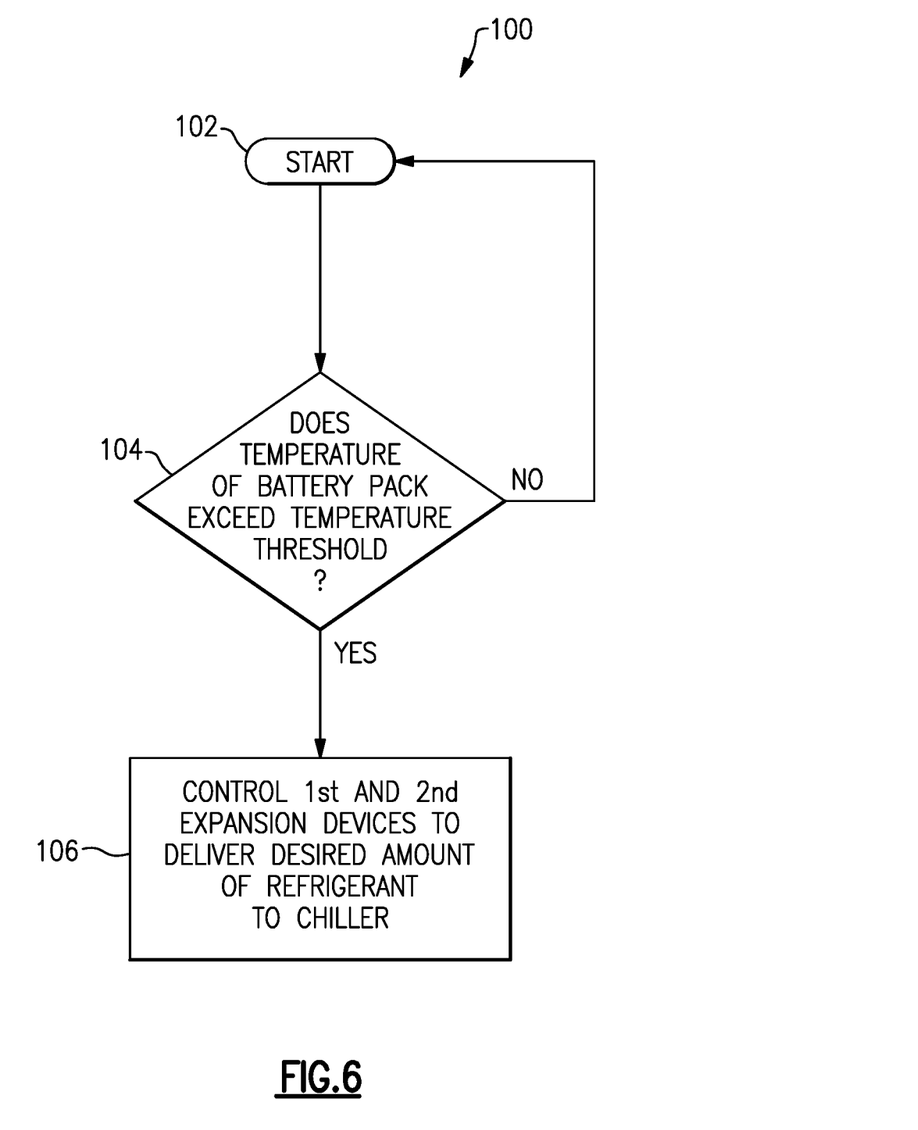
FIG. 6 schematically illustrates an exemplary control strategy for thermally managing a battery pack of an electrified vehicle.

FIG. 6, with continued reference to FIGS. 1-5, schematically illustrates a control strategy 100 for controlling the battery thermal management system 54 of the electrified vehicle 12. For example, the control strategy 100 can be executed to thermally manage the heat generated inside the battery pack 24. In one non-limiting embodiment, the control unit 94 is programmed with one or more algorithms adapted to execute the exemplary control strategy 100, or any other control strategy. In another non-limiting embodiment, the control strategy 100 is stored as executable instructions (e.g., as software code) in the memory of the control unit 94.

The control strategy 100 begins at block 102. Next, at block 104, the control strategy 100 determines whether a temperature of the battery pack 24 exceeds a temperature threshold. The temperature threshold is a temperature value stored in the memory of the control unit 94. If the temperature of the battery pack 24 exceeds the temperature threshold, which could occur during various high heat load conditions, the coolant subsystem 60 and refrigerant subsystem 62 are controlled to deliver a desired level of cooling necessary to chill the battery pack 24 to an appropriate level. In one non-limiting embodiment, the control unit 94 (with the aid of various sensors or other monitoring devices) monitors the temperature of the battery cells of the battery pack 24 and compares these temperatures to the temperature threshold to determine whether the level of cooling required.

The first and second expansion devices 80, 82 are controlled at block 106 to deliver a desired amount of refrigerant R to the chiller 66 from the rear evaporator 84 if the temperature of the battery pack 24 exceeds the temperature threshold at block 104. The desired amount of refrigerant R is communicated to the rear evaporator 84, inside of which the refrigerant R flow is split such that a desired amount of the refrigerant R is delivered to the chiller 66 through the tap line 92.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery thermal management system, comprising:
a battery pack;
a coolant subsystem including a chiller configured to cool said battery pack;
a refrigerant subsystem including at least one evaporator, said coolant subsystem arranged to exchange heat with said refrigerant subsystem within said chiller; and
a tap line located between an inlet and an outlet of the at least one evaporator and configured to communicate a refrigerant directly to a cold side of said chiller.

2. The system as recited in claim 1, wherein said tap line extends from a manifold of said at least one evaporator.

3. The system as recited in claim 1, wherein said coolant subsystem includes a pump configured to circulate a coolant through said chiller.

4. The system as recited in claim 3, wherein said coolant releases heat to a refrigerant of said refrigerant subsystem within said chiller.

5. The system as recited in claim 1, wherein said refrigerant subsystem includes a compressor.

6. The system as recited in claim 1, wherein said refrigerant subsystem includes a condenser.

7. The system as recited in claim 1, wherein said refrigerant subsystem includes a heat exchanger.

8. The system as recited in claim 1, wherein said at least one evaporator includes a front evaporator and a rear evaporator, and comprising a first expansion device configured to control flow of a refrigerant to said front evaporator and a second expansion device configured to control flow of said refrigerant to said rear evaporator and said chiller.

9. The system as recited in claim 8, comprising a control unit configured to selectively actuate said first expansion device and said second expansion device.

10. The system as recited in claim 8, wherein said first expansion device and said second expansion device include a thermal expansion valve.

11. The system as recited in claim 1, wherein said at least one evaporator includes a manifold and a baffle positioned within said manifold.

12. The system as recited in claim 11, wherein said baffle divides said manifold into a first section and a second section that is fluidly isolated from said first section.

13. The system as recited in claim 1, comprising a shut-off valve disposed in said tap line and configured to prevent communication of a refrigerant to said chiller.

14. A method, comprising:
controlling a flow of refrigerant to a front evaporator of a refrigerant subsystem with a first expansion device; and controlling the flow of the refrigerant to a rear evaporator of the refrigerant subsystem and to a chiller of a coolant subsystem with a second expansion device, the front evaporator arranged to thermally condition a vehicle front row seating and the rear evaporator arranged to thermally condition a vehicle rear row seating.

15. The method as recited in claim 14, comprising:
communicating the refrigerant from the rear evaporator to a cold side of the chiller within a tap line.

16. The method as recited in claim 14, comprising:
releasing heat from a coolant of the coolant subsystem to the refrigerant of the refrigerant subsystem within the chiller.

17. The method as recited in claim 16, comprising:
communicating the coolant exiting the chiller to a battery pack for thermally managing battery cells of the battery pack.

18. The method as recited in claim 14, comprising:
splitting the flow of the refrigerant inside the rear evaporator such that a portion of the refrigerant is directed to the chiller.

19. The method as recited in claim 14, comprising:
monitoring a temperature of a battery pack;
comparing the temperature to a temperature threshold; and
controlling the flow of the refrigerant from the rear evaporator to the chiller if the temperature exceeds the temperature threshold.

20. The method as recited in claim 14, comprising a tap line extending from the rear evaporator directly to the chiller.

21. An electrified vehicle, comprising:
a front evaporator arranged to thermally manage a front row seating;
a rear evaporator arranged to thermally manage a rear row seating;
a chiller arranged to thermally manage a battery pack;
a tap line extending from the rear evaporator directly to the chiller;
a first expansion device controlling a refrigerant flow to the front evaporator; and
a second expansion device controlling the refrigerant flow to the rear evaporator and the chiller.

* * * * *